(No Model.)
H. V. HAYES & J. S. STONE.
ELECTRIC CABLE.
No. 469,475. Patented Feb. 23, 1892.
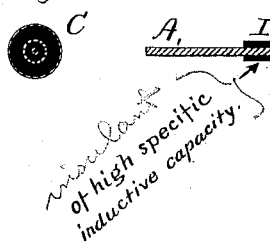
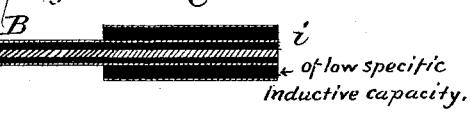
Fig. 1. Fig. 2.
insulant of high specific inductive capacity. ← of low specific inductive capacity.
conducting sheath
Fig. 3.
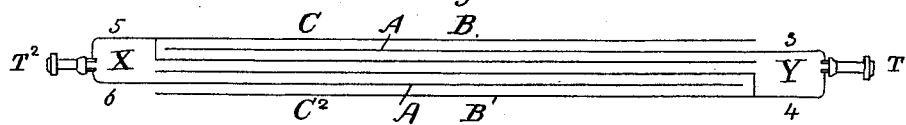
Fig. 4.
Fig. 5. Fig. 6.
Witnesses.
Inventors:
Hammond V. Hayes
and John S. Stone
by Pollok & Mauro
their attorneys.

UNITED STATES PATENT OFFICE.

HAMMOND V. HAYES, OF CAMBRIDGE, AND JOHN S. STONE, OF BOSTON, ASSIGNORS TO THE AMERICAN BELL TELEPHONE COMPANY, OF BOSTON, MASSACHUSETTS.

ELECTRIC CABLE.

SPECIFICATION forming part of Letters Patent No. 469,475, dated February 23, 1892.

Application filed October 12, 1891. Serial No. 408,538. (No model.)

*To all whom it may concern:*

Be it known that we, HAMMOND V. HAYES, residing at Cambridge, in the county of Middlesex and State of Massachusetts, and JOHN S. STONE, residing at Boston, in the county of Suffolk and State of Massachusetts, have invented certain Improvements in Electric Cables, of which the following is a specification.

This invention relates to electric cables, and has especial reference to those which comprise a multiplicity of conductors and which are adapted for use in association with double line or ring circuits for the transmission of telephonic currents.

Our invention provides that in such a cable the paired members of each double-line-circuit section shall each consist of two parallel conductors separated from one another by a layer of insulating material of high specific inductive capacity, but both separated from the two conductors of the other member of said pair and from other pairs by a suitable thickness of insulating material of low specific inductive capacity.

It comprehends, further, a paired and twisted circuit-section for such cables in which each member of the twisted pair represents one side of a double-line circuit, and is composed of a central conducting-core surrounded by a suitable thickness of insulating material of high inductive capacity and a sheath-conductor surrounding the insulated core so made, itself being in turn covered with and insulated by non-conducting material of very low specific inductive capacity.

It comprises, also, the combination of such a cable double-line-circuit conductor, with metallic circuit-loop extensions adapted to connect with its ends, which loops may include appropriate electrical instruments, such as telephones, and which, respectively, have their terminals connected at the two ends of the cable-section with the conducting-sheath of one member of a pair and with the conducting-core of its mate, the remaining sheath and core ends of the cable-section being left unattached or discontinuous. That member of the pair which connects by means of its core with the loop at one of its ends, leaving the conducting-sheath there discontinuous, at its other end connects with the loop-extension by means of its conducting-sheath, the core end being left discontinuous. Thus the core and sheath conductors of each member of an associated pair are always open at opposite ends and operate inductively upon each other, being throughout their length separated only by a thin stratum of non-conducting material whose specific inductive capacity is high.

The invention further consists in a cable composed of a number of such associated pairs of compound conductors preferably laid up in reversed layers.

In the drawings, which illustrate and form part of this specification, Figure 1 is a transverse section, and Fig. 2 a longitudinal section, of one of the members of a pair formed in accordance with the invention. Fig. 3 shows two such members associated by being twisted together, and thereby adapted to form a portion of a double-line circuit. Fig. 4 is a diagram of a metallic telephone-circuit, showing the construction of the cable-conductor; and Figs. 5 and 6 are respectively a cross-section and a longitudinal view, partly cut away, of a multiple-circuit cable embodying the invention.

Each of the members of a pair associated to form the cable-section of a double-line circuit is formed, as indicated in Figs. 1 and 2, of a central core or linear conductor A, such as a No. 22 copper wire, which is surrounded by a suitably-thick coating I, of non-conducting or insulating material possessing high specific inductive capacity. The insulated core so formed is now in turn covered by a cylindrical conducting-coating B, (which may be termed a "conducting-sheath,") and which should have a resistance substantially identical with that of the same length of the core-wire. This may be applied by electro-deposition, in a manner well understood, or a sheet of the proper size may be pressed over the insulated core; or, if desired, a helix of wire may be wound around the said core, or a wire fabric may be braided thereover. The whole is then surrounded by insulating material $i$, having as low a specific inductive capacity as is possible.

The non-conducting materials known commercially as "okonite," "kerite," or "rubber" possess, as is well known, high specific inductive capacities, and may be profitably used as the inner or core surrounding insulation, while such material as cotton and paper, having a specific inductive capacity which is much lower, may be applied to the exterior of the cylindrical sheath.

Fig. 3 illustrates an associated pair, formed by twisting together two such conductors C $C^2$ as have been described.

Fig. 4 illustrates an inductively-complete double-line telephone-circuit embodying the invention. The two compound conductors C and $C^2$ are (to facilitate description) shown as being stretched side by side, instead of being twisted together. Each has the conducting central wire A and the sheath B insulated, respectively, as hereinbefore stated. At the end Y a conducting-loop, consisting of the wires 3 and 4, connected through the instrument T, is united by one of its ends with the core-conductor of C and by its other end with the sheath-conductor of $C^2$. In the same way at the end X of the compound conductors a similar loop, comprising the wires 5 and 6, and the instrument $T^2$, is united by one of its ends with the sheath B of C and by its other end with the core A of $C^2$. It will be seen that a double-line circuit thus formed has no conductive connection between its ends, but consists virtually of two long loops open at their opposite ends and caused to overlap each other for the entire length of their cable-sections. By such a mode of construction many of the obstacles to telephonic transmission through cabled conductors are materially diminished, while the practical passage of voice-currents remains substantially unchanged, these being transferred by electrostatic induction, or by what has been called "admittance," between the conductors A and B of each side of the double-line circuit, these conductors, together with their intervening insulation, constituting a veritable condenser of sufficient capacity for efficient telephonic transmission. Moreover, since the external insulation of both members of a pair possesses low inductive capacity it is evident that reciprocal inductive interference between the two sides of a metallic circuit or between the members of different circuits will be at a minimum. Any convenient number of such associated pairs of compound conductors may be assembled in the same cable, as shown in Figs. 5 and 6. A single-twisted pair E, for example, may form a nucleus over which a group of like pairs F, forming the first layer, may be helically wound in a definite direction. Over this layer a second layer G of paired conductors may be laid, having a general helical direction opposed to that of the first layer, and so on until the cable H is of the desired size.

Although the diagram Fig. 4 and its appropriate descriptive matter indicate that at the two cable ends the connecting-loops connect, respectively, with the core of one of the compound-conductor sections and with the sheath of the other, this invention is clearly not limited to that mode of connection, it being evident that without departing from the spirit of the invention the loop at one end may be united to the two cores and the loop at the other end with the two sheath-conductors. Generally speaking, however, the mode first described is preferable.

The construction specifically hereinbefore described is generally preferred as embodying in a practical way the advantages which accrue from our invention. It is, however, obvious that a cable-section of a double-line circuit embodying our invention can be readily also made by using for each of its members two wires, each separately insulated by non-conducting material of high specific inductive capacity and arranged side by side within a common outer insulation of low specific inductive capacity and by connecting the two wires of the said members with circuit-continuations or loop-extensions, as indicated herein.

We claim—

1. A cable-section of a double-line circuit, composed of two associated members representing, respectively, the sides of said circuit, each member consisting of two independent parallel conductors separated from one another by a layer of insulating material of high specific inductive capacity and being insulated as a whole from its associated member by non-conducting material of low specific inductive capacity.

2. A cable-section of a double-line circuit, composed of two associated members twisted together and representing the two sides of said circuit, each member being a compound conductor comprising a central conducting-core covered by insulating material having high specific inductive capacity and surrounded by a conducting-sheath insulated externally by non-conducting material of low specific inductive capacity.

3. A paired and twisted cable-section of a double-line circuit, each member of the said pair being composed of a central conducting-core, a conducting-sheath surrounding the same, an interposed layer of insulating material having high specific inductive capacity, and an external insulating coating of low specific inductive capacity, in combination with loop-circuit continuations at the ends of said section, the loop at each end being connected with a different one of the two conductors of each member, the said conductors thus united at each end remaining open or discontinuous at the other end, substantially as described.

4. An inductively-complete double-line telephone-circuit, including a cable-section in which each side or member of the said double-line circuit is externally insulated by nonconducting material of low specific inductive capacity and consists of two separate conductors extending through the cable and insulated from each other by non-conducting material of high specific inductive capacity, one conductor of each member being connected with a closed loop-line constituting the circuit continuation at one end of the cable and the remaining conductor of each member being connected with a similar closed loop-line at the other end of the cable, substantially as described.

5. A conductively-discontinuous but inductively-complete double-line telephone-circuit including a cable-section and formed of two loop-lines closed at their outer ends through appropriate instruments and having their open ends at opposite ends of the cable-section, the branches of one of the said loops being each laid parallel to and inductively associated throughout the length of the cable with a corresponding branch of the other loop separated therefrom by non-conducting material of high specific inductive capacity to form, respectively, the cable-sections of each member of the circuit, the two members of such circuit being separated from one another by insulating material of low specific inductive capacity, substantially as described.

6. The hereinbefore-described cable or group of double-line-circuit sections, each consisting of two members twisted together to form, respectively, the sides of a metallic circuit and each member comprising a central conducting-core, a layer of insulating material surrounding the same and possessing a high specific conducting capacity, a cylindrical conductor forming a sheath or net-work surrounding the central insulated core, and an external insulation of low specific inductive capacity for the said outer conductor, substantially as described.

In testimony whereof we have signed our names to this specification, in the presence of two subscribing witnesses, this 9th day of October, 1891.

HAMMOND V. HAYES.
J. S. STONE.

Witnesses:
GEO. WILLIS PIERCE,
FRANK C. LOCKWOOD.